United States Patent
Scheidt et al.

(10) Patent No.: US 6,608,901 B2
(45) Date of Patent: *Aug. 19, 2003

(54) CRYPTOGRAPHIC KEY SPLIT COMBINER

(75) Inventors: Edward M. Scheidt, McLean, VA (US); C. Jay Wack, Clarksburg, MD (US)

(73) Assignee: TecSec, Inc., Vienna, VA (US)

( * ) Notice: Subject to any disclaimer, the term of this patent is extended or adjusted under 35 U.S.C. 154(b) by 43 days.

This patent is subject to a terminal disclaimer.

(21) Appl. No.: 09/917,794

(22) Filed: Jul. 31, 2001

(65) Prior Publication Data

US 2002/0071554 A1 Jun. 13, 2002

Related U.S. Application Data

(62) Division of application No. 09/023,672, filed on Feb. 13, 1998.
(60) Provisional application No. 60/039,696, filed on Feb. 13, 1997.

(51) Int. Cl.$^7$ .............................. H04L 9/22; H04L 9/24
(52) U.S. Cl. ............................ 380/44; 380/46; 380/47; 380/262; 380/264
(58) Field of Search ............................ 380/44, 46, 47, 380/262, 264, 268, 277; 708/250, 254, 255

(56) References Cited

U.S. PATENT DOCUMENTS

| | | | |
|---|---|---|---|
| 4,145,568 A | 3/1979 | Ehrat | 178/22 |
| 4,864,616 A | 9/1989 | Pond et al. | 380/25 |
| 5,276,738 A | 1/1994 | Hirsch | 380/46 |
| 5,541,994 A | 7/1996 | Tomko et al. | 380/30 |
| 5,627,894 A | 5/1997 | Albert et al. | 380/46 |
| 5,710,815 A | 1/1998 | Ming et al. | 380/20 |
| 5,751,808 A | 5/1998 | Anshel et al. | 380/23 |
| 5,778,069 A | 7/1998 | Thomlinson et al. | 380/25 |

*Primary Examiner*—Justin T. Darrow
(74) *Attorney, Agent, or Firm*—IP Strategies, PC

(57) ABSTRACT

A cryptographic key split combiner, which includes a number of key split generators for generating cryptographic key splits and a key split randomizer for randomizing the cryptographic key splits to produce a cryptographic key, and a process for forming cryptographic keys. Each of the key split generators generates key splits from seed data. The key split generators may include a random split generator for generating a random key split based on reference data. Other key split generators may include a token split generator for generating a token key split based on label data, a console split generator for generating a console key split based on maintenance data, and a biometric split generator for generating a biometric key split based on biometric data. All splits may further be based on static data, which may be updated, for example by modifying a prime number divisor of the static data. The label data may be read from a storage medium, and may include user authorization data. The resulting cryptographic key may be, for example, a stream of symbols, at least one symbol block, or a key matrix.

35 Claims, 2 Drawing Sheets

CRYPTOGRAPHIC KEY SPLIT COMBINER

CROSS-REFERENCE TO RELATED APPLICATIONS

This is a divisional of co-pending U.S. patent application Ser. No. 09/023,672, entitled "Cryptographic Key Split Combiner," filed Feb. 13, 1998, the disclosure of which is incorporated herein by reference, and the benefit of the filing date of which is claimed under 35 U.S.C. §120, which claims priority to U.S. provisional application Ser. No. 60/039,696, entitled "Cryptographic Key Split Combiner," filed Feb. 13, 1997, the disclosure of which is incorporated herein by reference. Further, this disclosure is related to the following co-pending U.S. patent applications: Ser. Nos. 09/874,364, entitled "Cryptographic Key Split Combiner," which was filed on Jun. 6, 2001 by SCHEIDT et al.; 09/917,795, entitled "Cryptographic Key Split Combiner," which was filed on Jul. 31, 2001 by SCHEIDT et al.; 09/917,802, entitled "Cryptographic Key Split Combiner," which was filed on Jul. 31, 2001 by SCHEIDT et al.; 09/917,807, entitled "Cryptographic Key Split Combiner," which was filed on Jul. 31, 2001 by SCHEIDT et al.; 09/992,529, entitled "Cryptographic Key Split Binder for Use with Tagged Data Elements," which was filed on Nov. 20, 2001 by SCHEIDT et al.; and 10/147,433, entitled "Cryptographic Key Split Binding Process and Apparatus," which was filed on May 16, 2002 by SCHEIDT.

FIELD OF THE INVENTION

The present invention relates to cryptographic systems. In particular, the present invention relates to a system for formulating cryptographic keys used to encrypt plaintext messages and decrypt ciphertext communications.

BACKGROUND OF THE INVENTION

In the modern world, communications are passed between parties in a variety of different ways utilizing many different communications media. Electronic communication is becoming increasingly popular as an efficient manner of transferring information, and electronic mail in particular is proliferating due to the immediacy of the medium.

Unfortunately, drawbacks accompany the benefits provided by electronic communication, particularly in the area of privacy. Electronic communications may be intercepted by unintended recipients. Wireless transmissions, such as voice communication by cellular telephone, and electronic mail are especially susceptible to such interception.

The problem of electronic communication privacy has been addressed, and solutions to the problem have been put in place. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

SUMMARY OF THE INVENTION

It is therefore an object of the present invention to provide a process and apparatus for assembling keys which provides added security against compromising a communication by unauthorized entities.

It is a further object of the present invention to provide a process and apparatus for developing key components that cannot be reproduced by unauthorized parties.

These and other objects and advantages are provided by a cryptographic key split combiner, which includes a number of key split generators for generating cryptographic key splits and a key split randomizer for randomizing the cryptographic key splits to produce a cryptographic key. Each of the key split generators generates key splits from seed data.

In one embodiment of the present invention, the key split generators include a random split generator for generating a random key split based on reference data. The random split generator may generate a random sequence based on the reference data, or may generate a pseudorandom sequence based on the reference data. The random key split may further be based on chronological data. The random key split may instead be based on the reference data and on static data, which may be updated. One manner of updating the static data is by modifying a prime number divisor of the static data.

Other key split generators may include, for example, a token split generator for generating a token key split based on label data and/or organization data and/or static data; a console split generator for generating a console key split based on maintenance data, whether previous or current, and/or on static data; and a biometric split generator for generating a biometric key split based on biometric data, which may include biometric data vectors and on biometric combiner data, and/or static data. The label data may be read from a storage medium, and may include user authorization data. The resulting cryptographic key may be, for example, a stream of symbols, at least one symbol block, or a key matrix.

The present invention also includes a process for forming cryptographic keys, which includes generating a plurality of cryptographic key splits from seed data and randomizing the cryptographic key splits to produce a cryptographic key. The cryptographic key splits may include, for example, a random key split based on reference data, a token key split based on label data, a console key split based on maintenance data, and a biometric key split based on biometric data. These key splits may be random sequences or pseudorandom sequences.

Generating the random key split may include generating a key split based on the reference data and on chronological data, or based on the reference data and on static data. Generating the token key split may include generating a key split based on the label data, which may be read from a storage medium and may include authorization data, and on organization data, or based on the label data and on static data. Generating the console key split may include generating a key split based on previous maintenance data and on current maintenance data, or based on the maintenance data and on static data. Generating the biometric key split may include generating a key split based on biometric data vectors and on biometric combiner data, or based on the biometric data and on static data.

The static data provided for any of the key splits may be updated. Updating the static data may include modifying a prime number divisor of the static data.

The resulting cryptographic key may be a stream of symbols, at least one symbol block, or a key matrix.

BRIEF DESCRIPTION OF THE DRAWINGS

The present invention will be more completely understood by way of the following detailed description, with reference to the following drawings. wherein.

DETAILED DESCRIPTION OF THE INVENTION

Figure 1:
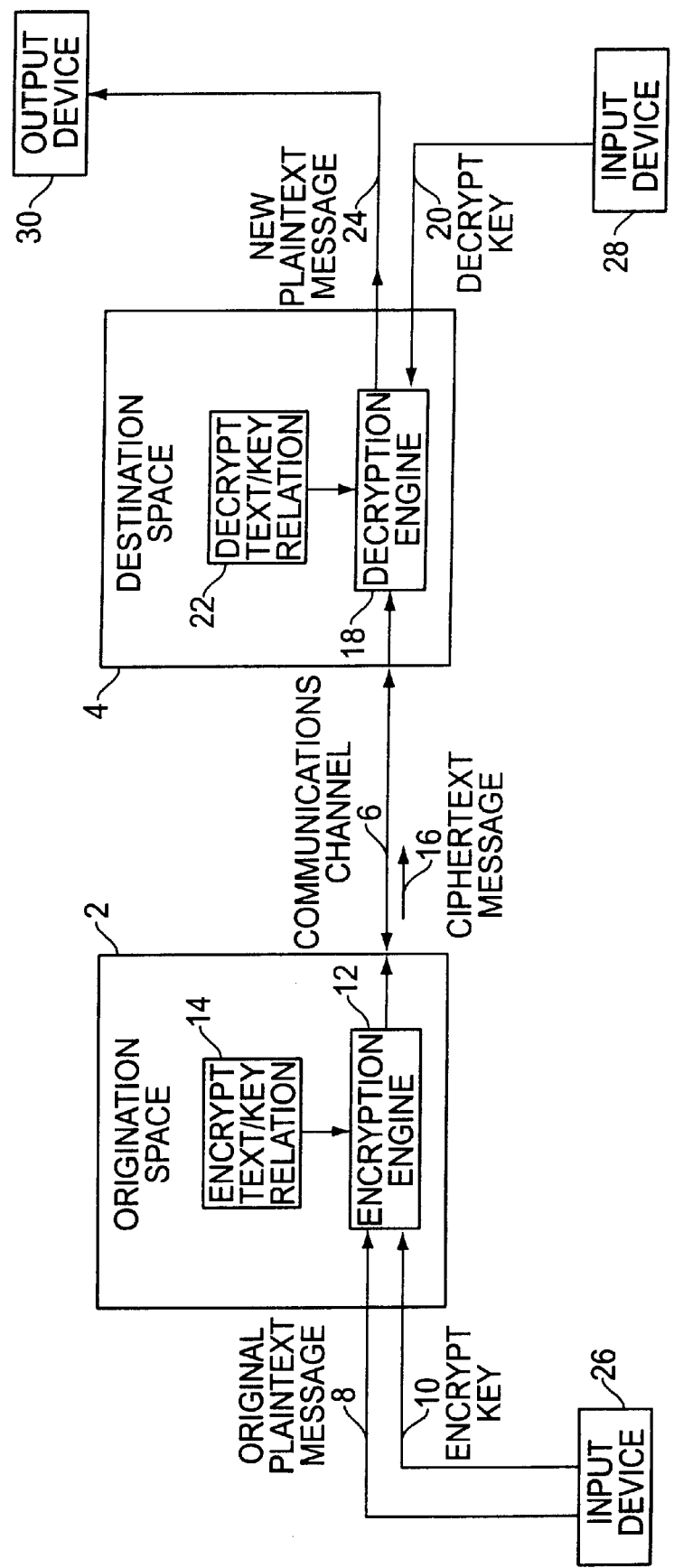
FIG. 1 shows a block diagram of a communications event featuring cryptography.

Referring to FIG. 1, a communication has an origination space 2 and a destination space 4. The origination space 2 defines the place and time at which the communication originates. The destination space 4 defines the place and time at which the communication is intended to be decoded. The origination space 2 and the destination space 4 may be remote in location. Alternatively, they may be collocated but displaced in time. The space and time correspondence between the origination space 2 and the destination space 4 depends on the nature of a particular communication. The origination space 2 and destination space 4 are coupled to a common communications channel 6. This communications channel 6 may bridge a physical space, such as empty air in the case of a cellular voice telephone call. Alternatively, the communications channel 6 may be temporary storage for the communication while time passes between the origination space 2 and the destination space 4, such as a message left in memory on a computer by a first user, for a second user to read at a later time on the same computer. The communications channel 6 may also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer may have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, may also be provided to present the new plaintext message to the destination user. The text/key relation can be stored on a floppy disk or other permanent or temporary portable storage, rather than in hard storage in the computer, to allow different text/key relations to be applied by different users or in different situations.

Figure 2:
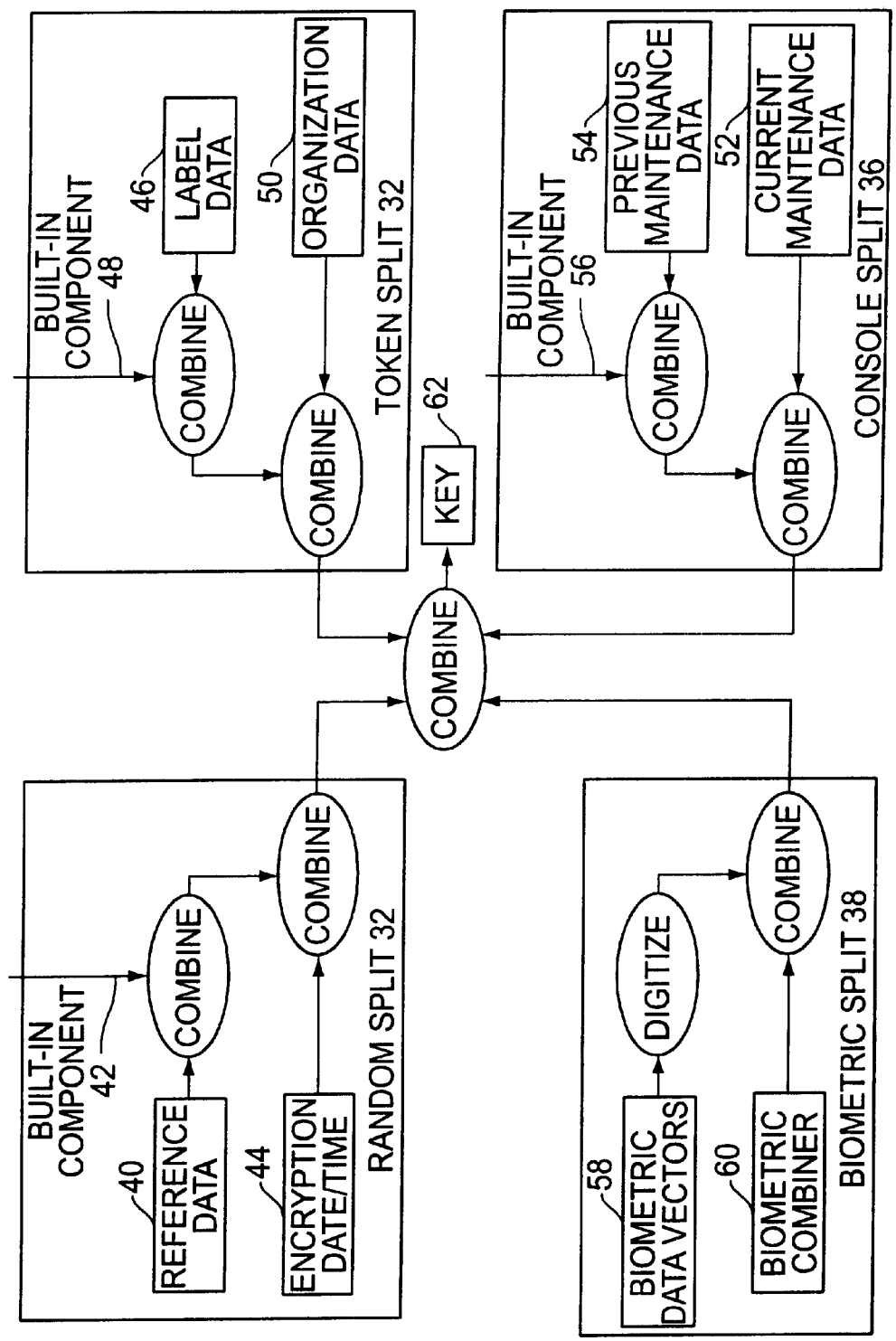
FIG. 2 is a block diagram of a key split combiner.

The keys that are provided at the origination space and at the destination space may be composed of several components, or splits, each of which may be provided by a different source. As shown in FIG. 2, a random key split 32 may be randomly or pseudorandomly generated. A second split 34 may be stored on a token. A third split 36 may be stored on a console, and a fourth split 38 may be provided by a biometric source. The key splits may be combined to form a complete cryptographic key. This key may take the form of a stream of symbols, a group of symbol blocks, an N-dimensional key matrix, or any other form usable by the particular encryption scheme.

The random split 32 provides a random component to the cryptographic key. This split 32 is randomly or pseudorandomly generated based on a seed which is provided by any source as reference data 40. For example, when a user attempts to log on to a system, the date and time of the user's log-on attempt, represented in digital form, can be used as a seed to generate the key split. That is, the seed may be provided to a pseudorandom sequence generator or other randomizer to produce the random split. Such pseudorandom sequence generators are well known in the art. For example, a simple hardware implementation could include a shift register, with various outputs of the register XORed and the result fed back to the input of the register. Alternatively, the seed may be combined, or randomized, with a built-in component 42, such as a fixed key seed stored at the origination space. The randomization may be performed, for example, by applying a variation of the text/key relation to the generated seed and the stored fixed key seed. This result may be further randomized with, for example, a digital representation of the date and time of the encryption 44, in order to produce the random key split 32.

The token split 34 may be generated in a similar fashion. In this case, the seed is provided on a token, that is, it is stored on a medium that is possessed by the user. For example, the seed may be stored on a floppy disk that the system must read as part of the encryption procedure. The token may store a number of different seeds, or label data 46, each of which corresponds to a different authorization provided by the system or specified by the user. For example, one seed may be used to generate a key split to authorize a particular user to read a message at a particular destination space. Another key seed may be used to generate a key split to authorize any member of a group of users to read a message at any destination space, and for one particular user to read the message and write over the message at a particular destination space. The label data 46 may even designate a window of time during which access to the communication is valid. This seed may be randomized with a built-in component 48, such as a seed stored at the origination space, which may then be further randomized with organization data 50 provided to the organization to which the user belongs.

The console split 36 is derived from a changing value stored at a user space, such as on a system console. Maintenance data, such as the checksum taken from a defragmentation table set, may be used to produce such changing values. For example, the current maintenance data 52 may be randomized with particular previous maintenance data. Alternatively, all previous maintenance data 54 may be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric samples of the user. For example, a retinal scanner may be used to obtain a unique retinal signature from the user. This information, in digital form, will then be used to generate the biometric split 38. This may be accomplished by, for example, randomizing a digital string corresponding to the biometric vectors 58 with biometric combiner data 60, which may be a digital hash of the user's system identification number or some other identifying data that can be linked to the user's physical data provided by the biometric reader. The resulting randomized data is the biometric split 38. The biometric split 38 provides information that is incapable of being reproduced by anyone but the user providing the biometric data vector 58.

The built-in key split components 42, 48, 56 described herein may be static in that they do not change based on uncontrolled parameters within the system. They may be updated for control purposes, however. For example, the built-in key split components 42, 48, 56 may be changed to modify the participation status of a particular user. The key split component may be changed completely to deny access to the user. Alternatively, only a single prime number divisor of the original key split component may be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

Once the key splits 32, 34, 36, 38 have been generated, they may be randomized together to produce the cryptographic key 62 for the communication. In performing each combination to generate the complete cryptographic key, a different variation of the text/key relation may be applied. The use of a plurality of different text/key relation variations adds to the security of the overall cryptographic scheme. It is contemplated that key splits other than those specifically described herein may be combined in forming the complete key 62. The total number of splits may also vary, and these splits may be used to build a key matrix to add to the complexity of the system. This complete key 62 should be in a form suitable for use in the particular cryptographic scheme. That is, different fields in the key may have different functions in the protocol of the communication, and should be arranged accordingly within the key.

At the destination space, the process is reversed in order to determine whether a user attempting to access a message has authorization, that is, has the valid key. The key supplied by the user at the destination space must include information required by the labels that were used to create the token split at the origination space. This information may also take the form of a token split. Further, a biometric split may be required as part of the destination key, in order to provide a link between assigned identification data for the user and physical data collected from the user biometrically. The token split and the biometric split may be combined with other splits at the destination space to form the complete destination key.

The invention has been described using exemplary and preferred embodiments. However, the scope of the present invention is not limited to these particular disclosed embodiments. To the contrary, the present invention is contemplated to encompass various modifications and similar arrangements The scope of the claims, therefore, should be accorded the broadest interpretation so as to include all such modifications and similar arrangements.

What is claimed is:

1. A cryptographic key split combiner, comprising:
a plurality of key split generators for generating cryptographic key splits; and
a key split randomizer for randomizing the cryptographic key splits to produce a cryptographic key;
wherein each of said key split generators includes means for generating key splits from seed data; and
wherein said plurality of key split generators includes a console split generator for generating a console key split based on maintenance data.

2. The cryptographic key split combiner of claim 1, wherein said console split generator includes means for generating a random sequence based on the maintenance data.

3. The cryptographic key split combiner of claim 1, wherein said console split generator includes means for generating a pseudorandom sequence based on the maintenance data.

4. The cryptographic key split combiner of claim 1, wherein said console split generator includes means for generating a key split based on previous maintenance data and on current maintenance data.

5. The cryptographic key split combiner of claim 1, wherein said console split generator includes means for generating a key split based on the maintenance data and on static data.

6. The cryptographic key split combiner of claim 5, further including means for updating the static data.

7. The cryptographic key spilt combiner of claim 5, wherein the means for updating the static data includes means for modifying a prime number divisor of the static data.

8. The cryptographic key split combiner of claim 1, wherein said plurality of key split generators includes a random split generator for generating a random key split based on reference data.

9. The cryptographic key split combiner of claim 8, wherein said random split generator includes means for generating a random sequence based on the reference data.

10. The cryptographic key split combiner of claim 8, wherein said random split generator includes means for generating a pseudorandom sequence based on the reference data.

11. The cryptographic key split combiner of claim 8, wherein said random split generator includes means for generating a key split based on the reference data and on chronological data.

12. The cryptographic key split combiner of claim 8, wherein said random split generator includes means for generating a key split based on the reference data and on static data.

13. The cryptographic key split combiner of claim 12, further including means for updating the static data.

14. The cryptographic key split combiner of claim 13, wherein the means for updating the static data includes means for modifying a prime number divisor of the static data.

15. The cryptographic key split combiner of claim 1, wherein the cryptographic key is a stream of symbols.

16. The cryptographic key split combiner of claim 1, wherein the cryptographic key is at least one symbol block.

17. The cryptographic key split combiner of claim 1, wherein the cryptographic key is a key matrix.

18. A process for forming cryptographic keys, comprising:

generating a plurality of cryptographic key splits from seed data; and randomizing the cryptographic key splits to produce a cryptographic key;

wherein generating a plurality of cryptographic key splits includes generating a console key split based on maintenance data.

19. The process of claim 18, wherein generating a console key split includes generating a random sequence based on the maintenance data.

20. The process of claim 18, wherein generating a console key split includes generating a pseudorandom sequence based on the maintenance data.

21. The process of claim 18, wherein generating a console key split includes generating a key split based on previous maintenance data and on current maintenance data.

22. The process of claim 18, wherein generating a console key split includes generating a key split based on the maintenance data and on static data.

23. The process of claim 22, further including updating the static data.

24. The process of claim 23, wherein the updating the static data includes modifying a prime number divisor of the static data.

25. The process of claim 18, wherein generating a plurality of cryptographic key splits includes generating a random key split based on reference data.

26. The process of claim 25, wherein generating a random key split includes generating a random sequence based on the reference data.

27. The process of claim 25, wherein generating a random key split includes generating a pseudorandom sequence based on the reference data.

28. The process of claim 25, wherein generating a random key split includes generating a key split based on the reference data and on chronological data.

29. The process of claim 25, wherein generating a random key split includes generating a key split based on the reference data and on static data.

30. The process of claim 29, further including updating the static data.

31. The process of claim 30, wherein updating the static data includes modifying a prime number divisor of the static data.

32. A cryptographic key, formed by the process of claim 18.

33. The cryptographic key of claim 32, including a stream of symbols.

34. The cryptographic key of claim 32, including at least one symbol block.

35. The cryptographic key of claim 32, including a key matrix.

* * * * *